United States Patent

[11] 3,627,833

| [72] | Inventor | Michael A. Tobias<br>Edison, N.J. |
| [21] | Appl. No. | 742,480 |
| [22] | Filed | July 5, 1968 |
| [45] | Patented | Dec. 14, 1971 |
| [73] | Assignee | Mobil Oil Corporation |

[54] PREPARATION OF DIHYDRORESORCINOL
1 Claim, No Drawings

[52] U.S. Cl. .................................................... 260/586 R,
260/621 H
[51] Int. Cl. .......................................................C07c 49/27,
C07c 45/00
[50] Field of Search........................................... 260/586 R

[56] References Cited
UNITED STATES PATENTS
2,799,708  7/1957  Oakley et al................. 260/586
OTHER REFERENCES
Reusch et al., J. Am. Chem. Soc., 84: 1759–1761 (I) 1962, 88: 2803–2810 (II), 1966
Johnson et al., J. Am. Chem. Soc., 85: 3894–6, (1963)

*Primary Examiner*—Leon Zitver
*Assistant Examiner*—Norman P. Morgenstern
*Attorneys*—Oswald G. Hayes, Donald L. Dickerson and Hastings S. Trigg

ABSTRACT: 2,3-Epoxycyclohexanone is rearranged thermally to dihydroresorcinol. Dehydrogenation of dihydroresorcinol produces resorcinol.

PREPARATION OF DIHYDRORESORCINOL

BACKGROUND OF THE INVENTION

Field of The Invention

This invention is directed to thermal rearrangement. It is more particularly concerned with the preparation of dihydroresorcinol.

DESCRIPTION OF THE PRIOR ART

No prior art has been found showing the thermal reaction of this invention. An analogous photochemical rearrangement has been reported in J. Am. Chem. Soc., 89, 3363 (1967). The thermal rearrangement of isophorone epoxide has been reported to yield only 2,4,4-trimethylcyclopentanone [J. Am. Chem. Soc., 84, 1759 (1962)].

SUMMARY OF THE INVENTION

This invention provides a process for producing dihydroresorcinol that comprises contacting 2,3-epoxycyclohexanone, in the vapor phase, in contact with inert solid (pebble) heat exchange media at temperatures of between about 250° and between about 700° C. and at an LHSV of between about 0.2 and between about 1.5.

DESCRIPTION OF SPECIFIC EMBODIMENTS

The 2,3-epoxycyclohexanone used in the process of this invention is known in the art. It is readily prepared by reacting 2-cyclohexene-1-one with hydrogen peroxide.

Although the reaction can be carried out without using a carrier, it is more advantageous to admix 2,3-epoxycyclohexanone vapors with an inert carrier gas such as nitrogen, hydrogen, helium, and argon. In practice, the vapors are contacted in the vapor phase with inert solid heat exchange materials such as glass beads, glass wool, aluminum spheres and other ceramic spheres or pellets ordinarily used in thermal reactions. The process can be carried out at temperatures of between about 250° and between about 700° C., preferably at between about 500° and between about 600° C. The contact time is readily expressed in terms of liquid hourly space velocity (LHSV) which can range from between about 0.2 and between about 1.5.

The process of this invention is readily carried out by means of a continuous process, but it may also be carried out batchwise. The process is readily carried out in standard reactors normally used for vapor phase reactions such as tubular reactors constructed of a metal such as stainless steel or of heat resistant glass or refractory materials.

As has been indicated hereinbefore, the dihydroresorcinol (1,3-cyclohexanedione) is readily converted by dehydrogenation to resorcinol. Typically, this dehydrogenation can be carried out in the vapor phase contact with noble metal catalyst using techniques and conditions described in U.S. Pat. No. 3,335,152. Other vapor phase and liquid phase methods well known in the art can be used to convert the dihydroresorcinol to resorcinol. The following examples illustrate the process of this invention.

EXAMPLE 1

A 6 thermal resistant glass ("Vycor") tube was filled with 30 cc. of No. 5 glass beads, wrapped with asbestos tape and placed into a small electric tube furnace. The reactor was heated to 550° C., and a stream of nitrogen, flowing at 340 cc./min., was passed through the reaction vessel.

Two and nine-tenths grams (0.025 mole) of 2,3-epoxycyclohexanone was introduced, at a rate of 0.1 cc./min., into a preheater at the top of the furnace where it was mixed with nitrogen and carried into the reaction zone. The condensed organic products yielded 1.7 g. of 1,3-cyclohexanedione, m.p. 99°–102b*L* C., whose infrared spectrum was identical to that of an authentic sample.

EXAMPLE 2

The same reactor described in example 1, was filled with 3 g. of quartz wool and heated to 500° C. in a stream of nitrogen flowing at 300 cc./min. 2 1/10 grams (0.025 mole) of 2,3-epoxycyclohexanone were introduced into the reactor in the same manner as that described in example 1. The condensed organic products yielded 1.5 g. of 1,3-cyclohexanedione.

Although the present invention has been described with preferred embodiments, it is to be understood that modifications and variations may be resorted to, without departing from the spirit and scope of this invention, as those skilled in the art will readily understand. such variations and modifications are considered to be within the purview and scope of the appended claims.

We claim:

1. A process for producing dihydroresorcinol that comprises contacting 2,3-epoxycyclohexanone, in the vapor phase, in contact with inert solid heat exchange media at temperatures of between about 250° and about 700° C. and at an LHSV of between about 0.2 and about 1.5.

* * * * *

PO-1050
(5/69)

UNITED STATES PATENT OFFICE
CERTIFICATE OF CORRECTION

Patent No. 3,627,833          Dated   December 14, 1971

Inventor(s)   Michael A. Tobias

It is certified that error appears in the above-identified patent and that said Letters Patent are hereby corrected as shown below:

Column 1, line 36, change "aluminum" to --alundum--

Column 2, line 14, delete "6" after A

Column 2, line 14, after A add --6" x 5/8"--

Column 2, line 24, change "99° - 102b LC." to --99° - 102°C.--

Column 2, line 30, change " 2 1/10" to -- 2 9/10--

Column 2, line 38, change "such" to --Such--

Column 2, line 41, change "We claim:" to --What is claimed is:--

Signed and sealed this 30th day of May 1972.

(SEAL)
Attest:

EDWARD M. FLETCHER, JR.          ROBERT GOTTSCHALK
Attesting Officer                Commissioner of Patents